Figure 4:
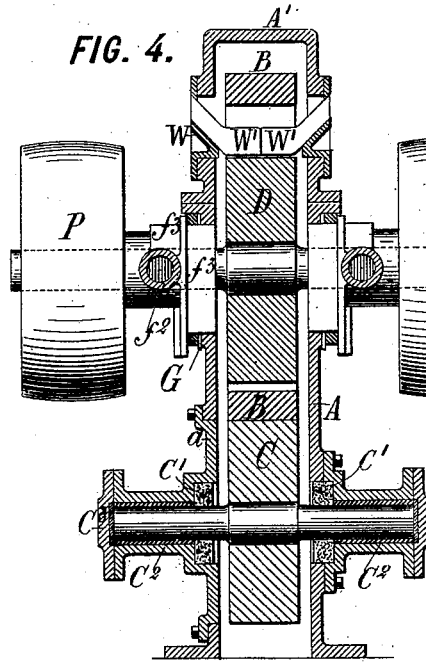

No. 705,323. Patented July 22, 1902.
R. CREUZBAUR.
PULVERIZER.
(Application filed May 11, 1896.)
(No Model.) 5 Sheets—Sheet 1.
FIG. 1.
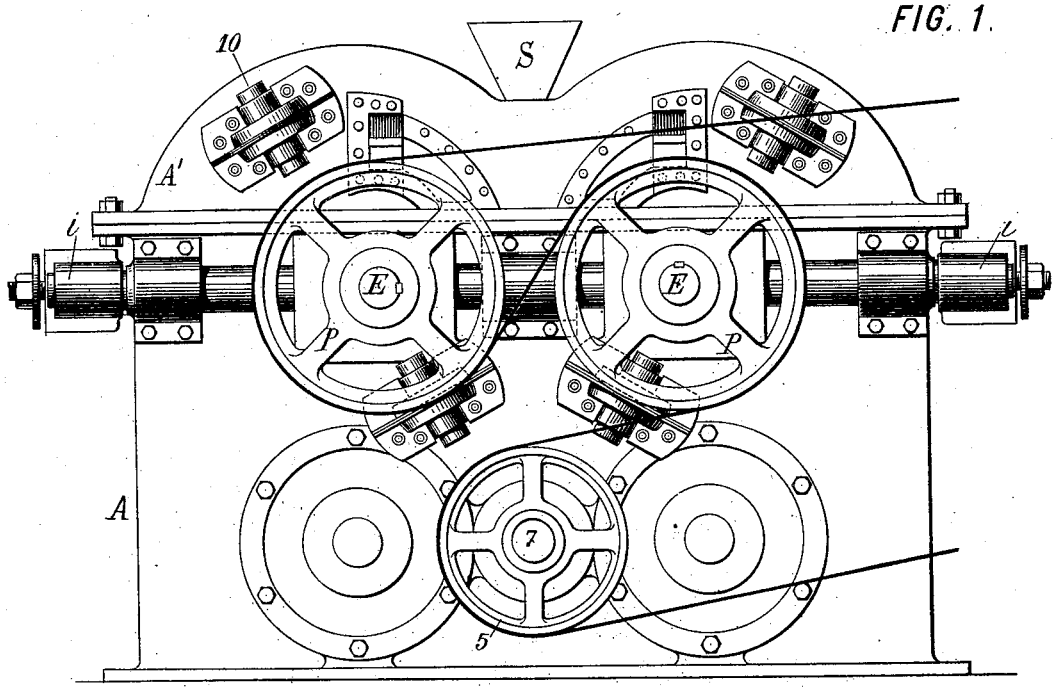
FIG. 1ª.
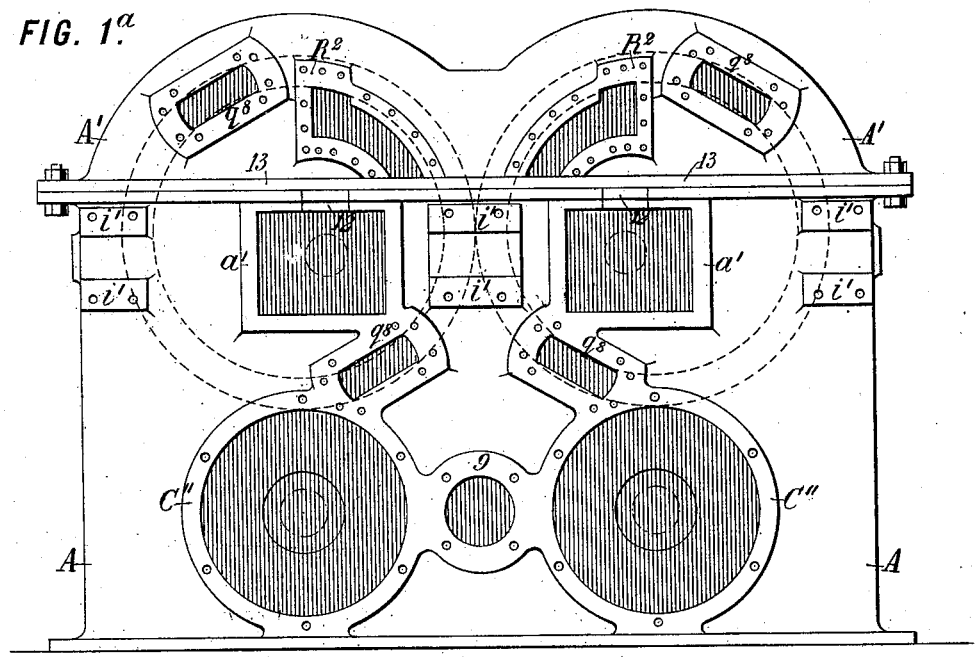
WITNESSES:
Fred White
Thomas F. Wallace
INVENTOR:
Robert Creuzbaur
By his Attorneys,
Arthur E. Fraser & Co.
THE NORRIS PETERS CO., PHOTO-LITHO., WASHINGTON, D. C.

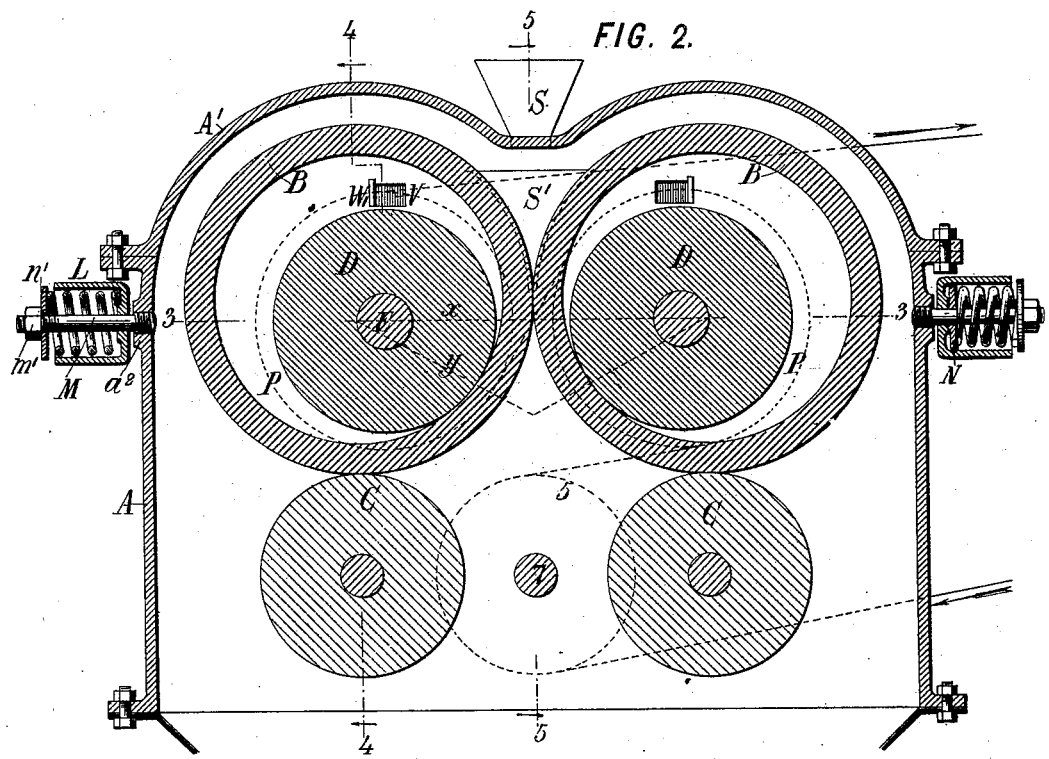
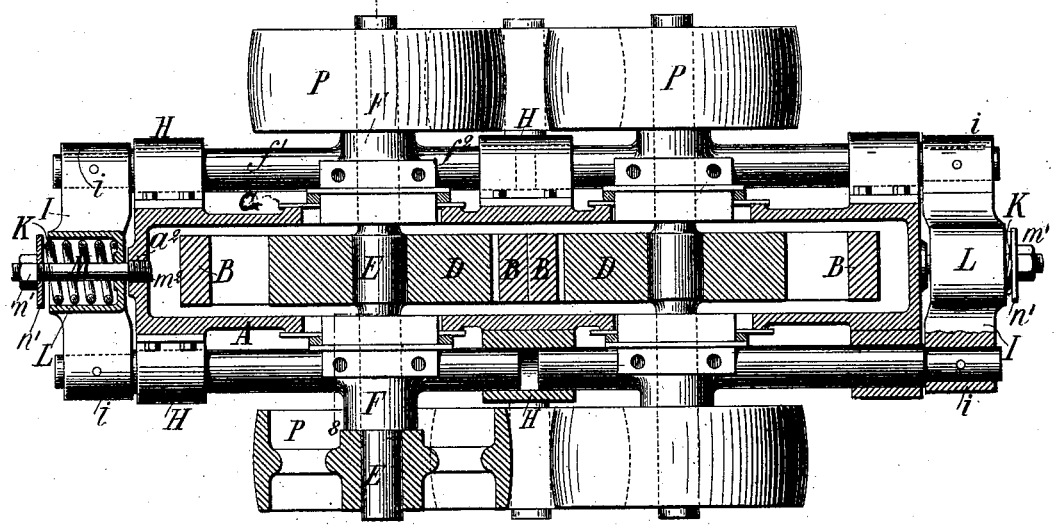

No. 705,323. Patented July 22, 1902.
R. CREUZBAUR.
PULVERIZER.
(Application filed May 11, 1896.)

(No Model.) 5 Sheets—Sheet 3.

WITNESSES:
Fred White
Thomas F. Wallace

INVENTOR:
Robert Creuzbaur,
By his Attorneys,
Arthur E. Fraser & Co.

No. 705,323. Patented July 22, 1902.
R. CREUZBAUR.
PULVERIZER.
(Application filed May 11, 1896.)
(No Model.) 5 Sheets—Sheet 4.

WITNESSES:
Fred White
Thomas F. Wallace

INVENTOR:
Robert Creuzbaur,
By his Attorneys,
Arthur E. Fraser

No. 705,323. Patented July 22, 1902.
R. CREUZBAUR.
PULVERIZER.
(Application filed May 11, 1896.)
(No Model.) 5 Sheets—Sheet 5.
FIG. 10. FIG. 12.
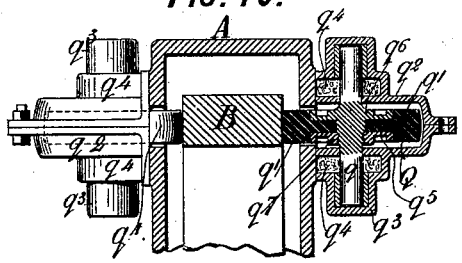
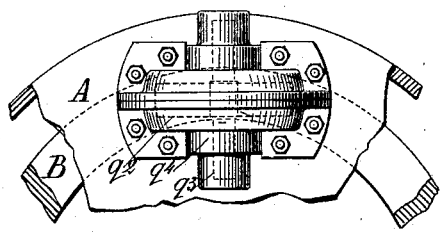
FIG. 11.
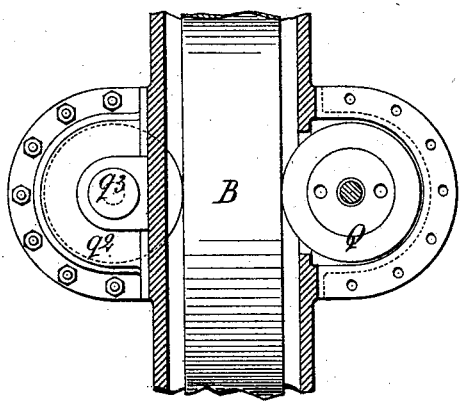
FIG. 16. FIG. 17.
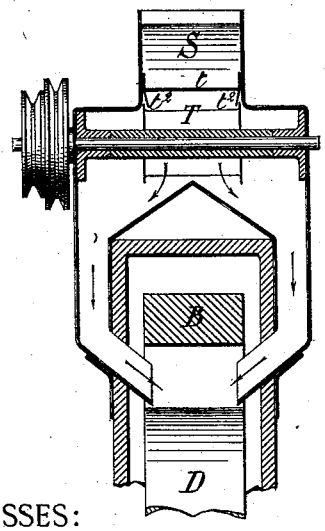
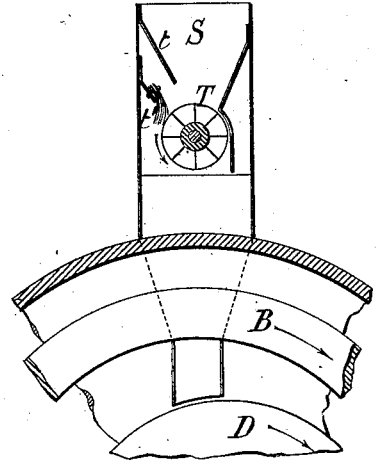
WITNESSES: INVENTOR:
Fred White Robert Creuzbaur,
Thomas F. Wallach By his Attorneys,
Arthur E. Fraser & Co.

UNITED STATES PATENT OFFICE.

ROBERT CREUZBAUR, OF BROOKLYN, NEW YORK.

PULVERIZER.

SPECIFICATION forming part of Letters Patent No. 705,323, dated July 22, 1902.

Application filed May 11, 1896. Serial No. 591,042. (No model.)

*To all whom it may concern:*

Be it known that I, ROBERT CREUZBAUR, a citizen of the United States, residing in Brooklyn, in the county of Kings and State of New York, have invented certain new and useful Improvements in Pulverizers, of which the following is a specification.

This invention relates to rock or ore crushers and pulverizers of that type wherein a revolving crushing-ring is employed encircling a power-driven crushing-roll, the material to be crushed being fed in between the ring and roll. In such machines the parts are driven at such speed that the material to be crushed is carried around with the ring by centrifugal force until it is effectually pulverized. In such crushers the ring has heretofore been supported exteriorly at two or more points upon antifriction-rollers, or in the case of a double machine, where two rings are employed in contact with each other, each ring serves as one of the supports for the other. In such machines the shaft of the crushing-roll is commonly mounted in movable or yielding bearings forced up by a spring or springs into firm contact with the ring, so as to afford sufficient crushing pressure and yet be capable of yielding in case of the interposition of material which is not crushed by such pressure. My present invention seeks to remedy the defects which have been developed in crushers or pulverizing-mills of this type as heretofore constructed. The frequent breakages of such mills are principally due to the confinement of said ring at more than three points and by rigid bearings and supports, thereby throwing destructive strains upon the bearings and other parts, which the utmost care in adjustments cannot prevent. The crushing of various sizes of stone of different degree of hardness causes the ring especially to vibrate forcibly, which under the high speed and great weight of the masses in motion must result in great wear and breakage unless the points of support and strains are confined to three in any one plane of motion and provision is made for cushioning the shocks.

Two of the leading axioms in mechanics are that three points of support or confinement are always in accord and that the sudden check of a mass in motion is destructive. The momentum of such a mass must therefore be taken up gradually by elastic or yielding parts, and to make such elasticity most effective the elastic medium must be near to the shock it is to neutralize.

To attain the confinement of the crushing-ring at three points only in the plane of its rotation, I place a single friction-roller as a support and guide under each ring, which constitutes one point of confinement. The contact-point between the two rings in a double-acting machine forms the second point of confinement. For the reason below stated I bring the point of contact of the crushing-roll with the crushing-ring between the other two points of confinement, thus forming the third point of confinement, all three of which preferably are yielding points, thus giving to the ring and to the roll the greatest admissible freedom of motion in the plane of their rotation compatible with the work to be done, with a minimum of strains upon all the parts, resulting in superior work at less cost of power and a minimum of wear and repair. The lowering of the contact-points between the rolls and the rings also brings the location of the mean crushing strains upon the rings about opposite their mutual contact-point. The exact location of the mean crushing strain upon the rings depends upon the dimensions of the material being pulverized and the drop of the rolls below the plane passing through the ring-centers. When such points of mean crushing strains coincide with the contact-points of the rings, half of the strain is balanced by the abutment of the rings upon each other. Hence such a double machine so arranged has only half the journal-friction of a single-acting mill having only one crushing-ring and one crushing-roll per ton of material pulverized.

The guidance of the rings laterally or at right angles to their plane of rotation is effected at two or three points to each only. One such point may be the said roller supporting the ring, which for that purpose may be formed with a convex periphery, the ring having a corresponding concave periphery. At one or two other points the ring is guided at each point by two elastic guide-rollers, one upon each side, rolling upon the flanks of the ring, their elasticity being preferably attained by rubber tires easily renewed. These flank guide-rollers are externally applied, being in touch with the crushing-ring through a slot in the casing duly housed over.

Another object of my improvements is to the better regulate the feed of the material into the mill, which I accomplish by a revolving chambered feed-cylinder secured against jamming by the construction described.

A vital condition provided for by my improvements is to maintain positive parallelism in the two yielding bearings of each crushing-roll shaft, which is accomplished by ample guidance to each bearing, a rigid connection of the two, and a central spring or springs pressing equally upon the two bearings, as described.

It is found in practice that the stone fed in is caused to remain upon the inner face of the ring by centrifugal force until pulverized. When, however, first fed in, before it has acquired such force it is liable to fall over the edge of the crushing-roll. Heretofore this has been prevented by annular plates or rings fitted to the inside of the casing, so as to flank the space between the ring and the roll. This involves an enlarged casing and provision for finishing it inside for the reception of these rings, which rings are rather a hindrance, checking the free escape of the pulverized material except between the feed-spout and the crushing-point. By my improvement these inside rings are omitted, the casing made correspondingly narrower, and its two sides and ends below the removable cap are cast in one piece and cored out opposite the said space to be flanked by guard-pieces, which are passed through said cored openings into due position and bolted to the outside of the casing by flanges provided upon the casing and upon the guard-pieces. By thus attaching the said guide-plates upon the outside of the casing all inside finish of the latter is eliminated, whereby it can be constructed solely with the view to rigidity, facility of access to the inside working parts, and low cost. These are attained by forming the casing of the main part or base cast in one piece, which carries all the shaft-bearings, and of a cap, which when removed gives access to the working parts.

I attain these objects by the mechanism illustrated in the accompanying drawings, in which—

Figure 5:
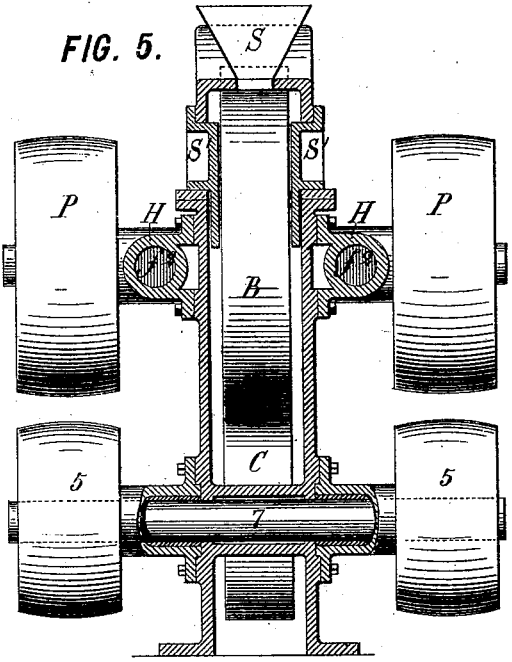
Figure 6:
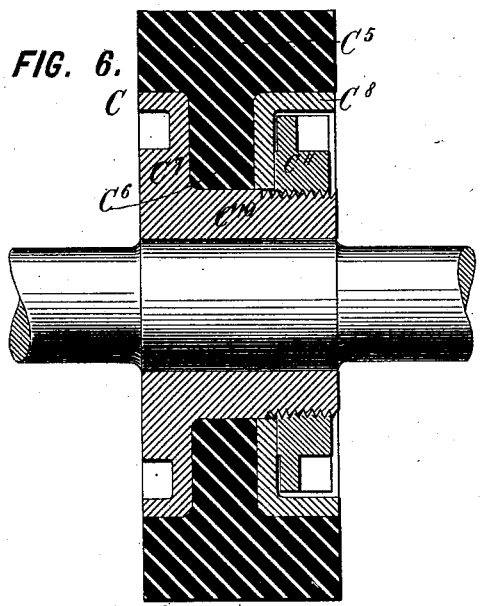
Figure 7:
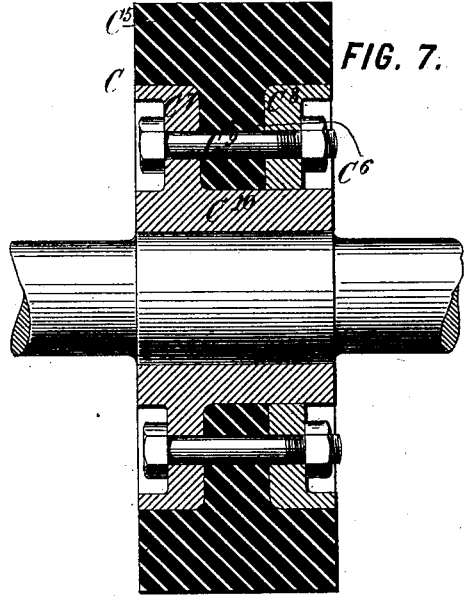
Figure 13:
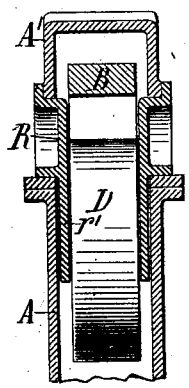
Figure 14:
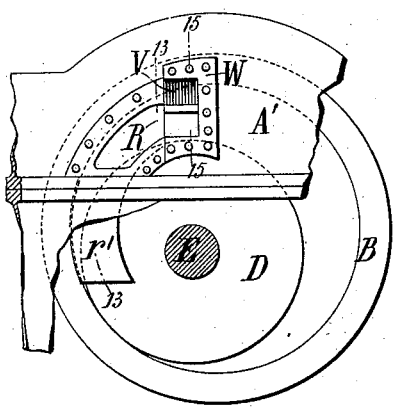
Figure 15:
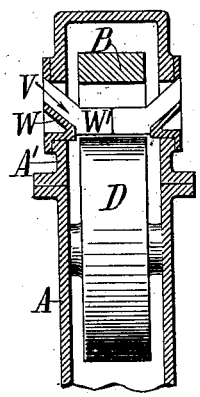
Figure 18:
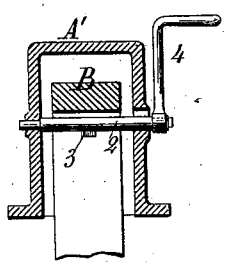
Figure 8:
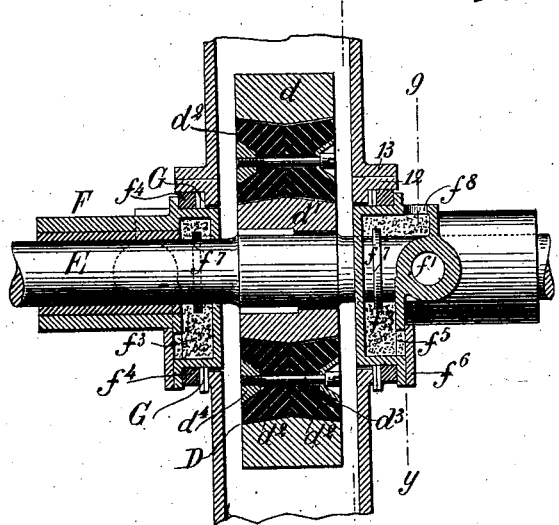
Figure 9:
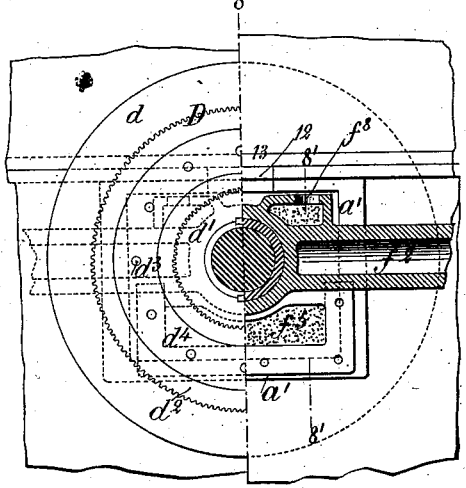

Figure 1 is a side elevation. Fig. 1ª is a side elevation of the casing. Fig. 2 is a longitudinal vertical mid-section. Fig. 3 is a plan, partly in horizontal section, cut in the plane of the line 3 3 in Fig. 2. Fig. 4 is a vertical transverse section on the line 4 4 in Fig. 2. Fig. 5 is a vertical transverse mid-section on the line 5 5 in Fig. 2. Figs. 6 and 7 are diametrical sections, on a larger scale, showing the constructions of the supporting-rollers. Figs. 8 and 9 are detail views, on a larger scale, showing the construction of the crushing-roll and its shaft-bearings, Fig. 8 being a vertical section in two planes, as denoted by the line 8 8 in Fig. 3, and Fig. 9 being a side view, the left-hand portion of which is in section on the line $9^x$, and the right-hand portion is in section on the line $9^y$ in Fig. 8. Figs. 10, 11, and 12 are detail views of the flank guide-rollers, Fig. 10 being a lateral elevation, partly in section, in the plane of the line 10 in Fig. 1, Fig. 11 being a sectional elevation viewed at right angles thereto, and Fig. 12 being a fragmentary elevation answering to Fig. 1. Figs. 13, 14, and 15 are fragmentary views showing details of construction, Fig. 13 being a section following the line 13 13 in Fig. 14, Fig. 14 being a mutilated side elevation, and Fig. 15 being a transverse section in approximately the same plane as Fig. 4. Figs. 16 and 17 are vertical sections showing the feed-hopper, Fig. 16 being a transverse section in the same plane as Fig. 4 and Fig. 17 being a vertical mid-section in the same plane as Fig. 2. Fig. 18 is a vertical transverse section of the cap part of the casing, showing the means for lifting the crushing-ring.

Like characters of reference refer to like parts throughout the several views.

A A' represent the casing, A being the stationary base and A' the cap-piece, which is detachable, so that the crushing rings and rolls may be placed and removed, the base A remaining intact.

B B are two crushing-rings. These may be made of suitable steel, about three inches thick, six inches wide, and of about thirty-two inches outside diameter. They are preferably square-faced upon the inside and outside. These rings are placed in touch with each other, as shown. At their lower ends they are supported and guided each by a roller C. These rollers may be about eighteen inches in diameter, fixed upon shafts not less than three inches in diameter. These rollers may be of iron or steel throughout, with springs or other yielding mechanism giving elasticity or yielding motion to their bearings and shaft, or the roller C may have a rubber or other flexible tread, with rigid or yielding journals, or may incorporate flexible material in its web. I prefer to use a rubber tread, made renewable, as shown in Fig. 7, with rigid journals, such construction bringing the elasticity nearest to the shocks it is to neutralize. I form this rubber tread $C^5$ with a central web $C^6$, as shown, which is clamped between the two metal flanges $C^7$ $C^8$ by bolts $C^9$, the flange $C^7$ being formed integrally with the hub $C^{10}$ and the flange $C^8$ being loose, but closely fitted to the hub. In Fig. 6 the bolts $C^9$ are omitted, the flange $C^8$ being clamped upon the web $C^6$ by the nut $C^{11}$, screwed upon the hub $C^{10}$.

One side of casing A is formed with a circular opening to admit the passage of roller C, this opening being covered by cap $a$, Fig. 4, formed integrally with the stuffing-box C' and journal-box $C^2$. An end cap $C^3$ closes the end of the journal-box and takes up the end strains upon the shaft. The cotton-waste in the box C' prevents the dust from the mill reaching the journal C². Upon the other end the stuffing-box C' and journal C² are formed by a casting, as shown, bolted to the casing A. The stuffing-boxes are filled with cotton-waste or other material to prevent grit entering the bearings.

Within each of the rings B B a crushing-roll D is mounted. This may be about six inches wide and twenty-one inches in diameter, or about five inches less in diameter than the inside diameter of the rings B B. The pulverizing is done between these rolls D D and rings B B. To cause the strains upon these rings to be truly balanced or neutralized by each other, the contact-points of the rolls D with the rings B are placed sufficiently below the contact-point of the rings B with each other to bring the mean crushing strains in line with this contact-point of rings B. This drop of rolls D depends upon the dimensions of the stones pulverized. Placing the contact-points of the rolls D with rings B about thirty degrees below a line $x$ passing through the centers of the rings B, with these centers as the apex of the angle, is considered about proper for broken stone passing through a one-inch-mesh screen. The crushing-roll axis would accordingly lie in the line $y$, making an angle of thirty degrees with the line $x$ passing through the ring-centers, as aforesaid, and the mean crushing strain upon the rings would lie about at or a little below the plane of the line $x$. These rolls D may be made of cast-iron with chilled faces or with a steel tire about three inches thick and an elastic web of a rubber fabric or a paper fabric, such as is used in railway-car wheels. I preferably use, as shown in Figs. 8 and 9, a steel tire $d$, arched and ribbed upon the inside, the hub $d'$, arched and ribbed upon its circumference, and the rubber fabric web $d^2$, molded in halves, as shown, and corresponding in shape to the arched and ribbed formation of said tire and hub. These webs are perforated for the bolts $d^3$ shown to pass through them and have truncated cone-shaped annular depressions upon their outer faces for the reception of the correspondingly-formed annular rings $d^4$. These rings $d^4$ being drawn toward each other by the bolts, the webs $d^2$ are forced to enter the corrugations upon the ring and hub, and thereby prevent slip between the web on the one hand and the ring and hub on the other.

Each crushing-roll D is mounted upon a shaft E, having its bearings at both ends in a yielding journal. The means for accomplishing this must be such that true parallelism of the shaft-bearings is preserved in all changes of position, which can only be attained by a construction insuring an exactly equal amount of yield of the two bearings. I accomplish this as follows: The shaft E is preferably about three and one-half inches in diameter at the ends and four inches in diameter in the middle, where the hub is fixed to the same by two opposite keys, as shown. Upon each side the journal-box F is formed integrally with the two slide-arms $f'$ $f^2$ and the stuffing-box $f^3$, which prevents the entrance of dust into the journal. The casing A is cut out, so as to allow the shaft about two inches play horizontally, as shown in Figs. 3 and 9. It is also cut out upwardly up to the cap A', so that the roll D may be lifted out when cap A' is removed, the false piece 12, Fig. 9, being bolted to the flange 13 of cap A'. The plate G, Figs. 3, 4, and 8, which surrounds the stuffing-box $f^3$ and moves with it and the shaft E in their oscillations fore and aft, prevents the escape of dust from the casing by bearing and sliding upon the tool-finished face or boss $a'$, Fig. 1ᵃ, upon the casing while bearing upon the other side upon the rubber ring $f^4$, thus forming a tight joint upon both sides of plate G. The arms $f'$ $f^2$ are finished so as to slide freely within the two sleeves H, which are bolted upon finished bosses $i'$ upon the casing A. The end of arm $f'$ is turned down, so as to form a shoulder, as shown. The two sleeves $i$ $i$, which form part of the cross-beam or yoke I, are driven home over the ends of the two arms $f'f'$ down upon said shoulders. The spring K under a tension of about ten thousand pounds or more bears centrally upon yoke I, being housed in cup L, which forms part of the yoke I. The spindle M, which is screw-threaded at both ends, is screwed into the hub $a^2$, formed upon the casing A, or this spindle M may be without screw-threads at its inner end and driven into said hub to a shoulder and riveted over upon the inside. The yoke I, centrally perforated, being entered over the spindle M, the spring K is, or preferably a number of springs clustered around the spindle M are, chambered in said cup L of the yoke, pressing upon the latter through an intervening disk N, Fig. 2, which bears upon the yoke close around the spindle M only by means of a narrow hub upon the yoke or upon the disk, the purpose of this arrangement being to prevent unequal pressure upon the two ends of the yoke. Another disk $n'$ intervenes between the outer ends of the spring K and the nut $m'$, whereby the tension of the spring is regulated. As a safeguard against the turning of the spindle under the strain upon it in adjusting the tension of the spring, a key-screw may be inserted from the inside.

A belt-pulley P is mounted upon each end of the shaft E, preferably so as to overhang the bearing, thereby saving space and attaining a more perfect transmission of power.

The crushing-rings B are held in place in the vertical plane of their rotation by the three points above named—to wit, by their supporting-rollers C, forming one point of support to each ring; by their contact with each other, forming the second point of confinement to each ring, and by the respective contact-points of the crushing-rolls D with the rings, forming the third point of confinement, which three points hold each ring B in positive position in a vertical plane without jarring or undue strain being thrown by any of these points upon either of the others, three points of support being always in harmony with each other. Laterally, each ring B is also confined at three or two points only, with like harmony and avoidance of undue jars, strains, and abrasion. An attempt has heretofore been made to confine the rings B centrally in the casing by forming their outer faces concave, and the faces of their supporting and guiding rollers correspondingly convex. Such formation results in grinding action between the ring and rollers, owing to their different rates of surface speeds due to their coned shape. I therefore guide the rings B by rollers Q, Figs. 10, 11, and 12, bearing upon the flanks of the rings. Upon opposite ends of each ring B, I place two such rollers bearing upon the opposite flanks of the ring, making four rollers Q to each ring, a pair at each point. Three pairs might be used, equally distributed around the ring. I preferably place two pairs of such rollers at opposite points, more or less removed from the contact-points of the rings with each other and with the crushing-rolls D, because these points serve to prevent the swinging of the rings with said flank-rollers Q as pivots, whereby two pairs of rollers Q suffice to keep them truly in place. These flank friction-rollers Q may be constructed in various ways, but in every case must be adapted to slightly yield to shocks—that is, they must incorporate elasticity either through springs retaining their journals in place or by elastic material embodied in the web of the roller, or by an elastic tread to the roller. I prefer the latter construction as most effective, because it brings the elasticity nearest to the shocks to be neutralized thereby. Such a construction is shown in Figs. 10, 11, and 12, in which the elastic tread $q'$ is formed with a web $q^5$, held in place between a flange $q^6$, formed integrally with the shaft $q$ and the disk $q^7$, screwed upon the shaft $q$. The casing $q^2$ is made in halves, as shown. A journal-box $q^3$, closed at the end to take the end thrust, is formed integrally with each half. These half-casings are slipped over the ends of the shaft $q$ and then bolted together. A stuffing-box $q^4$, packed with cotton-waste, intervenes between each journal-box and the roller Q, whereby dust is prevented from reaching the journals. A slot is cut in the casing A or A', through which the roller Q reaches the respective flank of the ring B. The jointed casing $q^2$ is bolted to the casing A or A', as shown. Adjustment of the roller Q in the direction toward the flank of the ring B is made by more or less packing between the flange of its casing $q^2$ and its seat upon the casing A or A'.

The broken stone to be pulverized is introduced between the roll D and the ring B by one or two hoppers, as shown. The stone so placed, after centrifugal force is imparted to it during its passage between a ring B and roll D, which pulverize it more or less during the first contact, remains lodged against the inner face of ring B until pulverized so fine that centrifugal force ceases to prevent its discharge over the sides of the ring through the one-inch clearances between the ring B and the casing A A'; but as the stone is not under the action of centrifugal force when first delivered upon roll D it is necessary to prevent its falling over its edges ere such force is imparted to it. To accomplish this, the casing A, Fig. 1ª, is cored or formed with an arc-shaped opening corresponding in position to the space between the roll and the ring and opposite that space. A flanged casting R, Figs. 13 and 14, of corresponding and slightly-reduced shape, is entered through said cored opening sufficiently far to attain the object named, its flanges being bolted to corresponding flanges upon the outside of the casing. Two such guard-pieces R are required for each ring and roll—in all four for a double acting mill having two rings B and two rolls D. Although the crescent-shaped spaces between the rings and the rolls extend below the cap A' the guard-pieces R are attached to the cap only, a pendent part $r'$ thereof extending down into the main casing A to the lower end of the crescent-shaped crushing-space. To secure sufficient rigidity to this pendent piece $r'$, it is made wider than is otherwise necessary. For convenience of manufacture and mounting the upper ends of the guard-plates R extend only to the feed-inlets V, a separate casting W forming the hopper-seat, the feed-opening and channel V, and transverse guard-plate W', which prevents the spilling of the infed material behind the roll before it has the motion of the roll imparted to it.

I preferably feed in the stone through the revolving bucket-wheel T, inclosed by the hopper S, Figs. 16 and 17, and revolved by a belt connection to the shaft E of the crushing-roll D. The shield $t$ prevents the crowding of the stone upon the down side of the bucket-wheel T, and the flexible side $t'$, formed of bristles or other yielding elastic rebounding material, prevents the jamming of the stone in its delivery through the wheel T. The end aprons $t^2$ prevent the jamming of grit and dust between the ends of the wheel T and the hopper-casing. This method of feeding gives easy control over the amount fed in by change of the speed of rotation, for which purpose different-speed cone-pulleys are shown upon the shaft of the cylinder or bucket-wheel T in Fig. 16. It secures the delivery of a constant amount and prevents the escape of dust.

The pulverized product is passed over a screen in the usual way, the portion of it not fine enough to pass the screen being again fed into the hopper.

Material may also be crushed between the two rings B B, Fig. 2, which require no other addition than a third hopper S and wearing-plates $s'$, the springs acting upon the two crushing-rolls giving to the rings the required yield for that purpose. The crushing between these two rings being done between two convex surfaces, as in common crushing-rollers, reduces their bite upon the ore. The increase of bite and the more gradual crushing between convex and concave peripheral surfaces, as between the roll and the rings, is an advantage in favor of the latter tending to reduce the wear of the rolls and the power consumed. In this case this objection is reduced by the larger diameter of the rings.

To facilitate the removal and replacement of the roller C, provision is made for slightly raising and suspending the ring B, supported thereby, as follows, referring to Fig. 18: The crank-shaft 2 is inserted through corresponding perforations in the sides of cap $A'$, located so that the shaft 2 can be entered close to, but without touching the under side of the ring. The opening nearest the crank 4 is enlarged upwardly, so that the eccentric part 3 of the shaft can pass through, the width of the eccentric being no greater than the space between the casing and the ring, so that the eccentric can be turned down before entering the ring. The crank-shaft being fully entered, a half-revolution of the same will slightly raise the ring and hold it there. When this crank-shaft is removed, the shaft-openings in the cap A are closed in any convenient manner, preferably by a flanged plug secured by its flange.

Fig. 1$^a$ represents the seats for the shaft-bearings and the other appendages, which are all attached to the outside of the casing, there being no finish whatever upon the inside. $a'$ represents the seats for the plates G, which prevent the escape of dust around the shaft E and its dust-boxes $f^3$. $q^s$ represents the seats for the flank-roller casings $q^2$. $R^2$ represents the seats for the flank-guard plates R and the inlet-castings W. $i'$ represents the seats for the sleeves $i$, which guide the slide-arms for the bearings of the crushing-roll shaft. $C''$ represents the seats for the caps $a'$, which carry the bearings on one side of the shafts of rollers C, which support rings B, and 9 is the seat for one of the bearings of the shaft 7 of belt-pulley 5, Figs. 2 and 5. These seats are all in one plane, so that they receive their finish upon the planer by through cuts without moving the casting.

In Fig. 8 two plates G are represented one upon the other, which serves the purpose of entering them in place without dismounting the respective dust-box and bearing, these plates being cut in two upon a vertical line and of uneven width, so as to break joints when in place and screwed together.

In Figs. 8 and 9, $f^8$ and $f^5$ are openings to insert and reach the cotton-waste in the stuffing-box $f^3$, the round opening $f^8$ being closed by a screw-plug and the long opening $f^5$ by the cap $f^6$, Fig. 8.

$f^7$ is preferably a split ring closely fitting the shaft E and serves to intercept the dust which may pass between the cotton-waste and the shaft, where the rotation of the shaft is apt to form an opening. Such a shoulder $f$ could be formed integrally with the shaft were it not for the difficulty of inserting the shaft without complicating the construction of the dust-box. Another substitute would be the grooving of the shaft were it not for the diminution of its strength.

I claim as my invention and desire to secure by Letters Patent—

1. In a pulverizer, a crushing-ring and a crushing-roll within the ring adapted to revolve in touch with each other as described; yielding bearings for the shaft of said roll, a spring adapted to hold said roll in contact with said ring, suitable supporting means adapted to support said ring in the plane of its rotation, but leaving it free to move laterally, a casing inclosing the said roll and ring, and guide-rollers arranged to act solely against the flanks of said ring upon opposite sides thereof, to limit the lateral displacement of the ring, and return it in correct relation to the casing.

2. In a pulverizer, two revoluble crushing-rings in peripheral contact with each other; a crushing-roll within each of said rings; yielding bearings to the shafts thereof; springs tending to hold said rolls in forcible contact with said rings; supporting-rollers under said rings and a casing inclosing said crushing rolls and rings, in combination with guide-rollers for said rings arranged to bear solely upon their flanks, upon opposite sides, to limit the lateral displacement of the rings and retain them in correct relation to the casing, substantially as shown and described.

3. In a pulverizer, the combination with a crushing-ring, a crushing-roll within the ring, and means for pressing the roll against the ring, of two exterior supports for the ring making contact with it at points on opposite sides of its contact with the crushing-roll, consisting of a roller underneath the ring supporting its weight, and of a revolving surface bearing upon the periphery of the ring at a point above the internal point of contact of the ring with the crushing-roll.

4. In a pulverizer, the combination with two crushing-rings in peripheral contact with each other, crushing-rolls within the respective rings making contact therewith below the point of mutual contact of the rings, means for pressing each roll against its ring and thereby forcing the rings into contact, and supporting-rollers for the respective rings making contact therewith below their contact with the crushing-rolls, whereby each ring is confined at three points in the plane of its rotation, namely, by its contact with the other ring above, with the supporting-roller below, and with its crushing-roll between the other two.

5. In a pulverizer, the combination with a crushing-ring, a crushing-roll within the ring, and means for pressing the roll against the ring, of two exterior supports for the ring making contact with it at points on opposite sides of its contact with the crushing-roll, consisting of a roller underneath the ring supporting its weight, and a revolving surface bearing upon the periphery of the ring at a point above the internal point of contact of the ring with the crushing-roll, whereby the ring is confined at three points in the plane of its rotation, and lateral guides for the ring consisting of guide-rollers arranged to act against the flanks of said ring.

6. In a pulverizer, the combination with two crushing-rings in peripheral contact with each other, crushing-rolls within the respective rings making contact therewith below the point of mutual contact of the rings, means for pressing each roll against its ring and thereby forcing the rings into contact, and supporting-rollers for the respective rings making contact therewith below their contact with the crushing-rolls, whereby each ring is confined at three points in the plane of its rotation, namely, by its contact with the other ring above, with the supporting-roller below, and with its crushing-roll between the other two, and lateral guides for each of said rings, consisting of pairs of guide-rollers arranged to act against the flanks of said ring.

7. In a pulverizer, the combination with a crushing-ring, a crushing-roll within the ring, and means for pressing the roll against the ring, of an exterior support for the ring consisting of a roller in continuous peripheral contact therewith, mounted on a shaft having fixed bearings, said roller having a yielding material incorporated in it, adapted to cushion the vibration of the ring.

8. In a pulverizer, the combination with a crushing-ring, a crushing-roll within the ring, and means for pressing the roll against the ring, of an exterior support for the ring consisting of a yielding roller in continuous peripheral contact with the ring and constructed with a tread of compressible elastic material, adapted to cushion the vibration of the ring.

9. In a pulverizer, the combination with a crushing roll and ring, and a main casing inclosing them, of lateral guides for said ring consisting of guide-rollers arranged to roll against the flanks of said ring, projecting through slots in said casing, and bearings and casings for said lateral rollers located outside said main casing.

10. In a pulverizer, the combination with a crushing roll and ring, and a main casing inclosing them, of lateral guides for said ring consisting of guide-rollers arranged to roll against the flanks of said ring, projecting through slots in said casing, bearings for the journals of said rollers, and intervening dust-intercepting stuffing-boxes.

11. In a pulverizer, the combination with a crushing roll and ring, and a main casing inclosing them, of lateral guides for said ring consisting of guide-rollers arranged to roll against the flanks of said ring, projecting through slots in said casing, and casings for said guide-rollers formed in sections, including bearings for the journals thereof, and adapted to be bolted together and to be fastened to said main casing to close said slots.

12. In a pulverizer, the combination with a crushing-ring, a crushing-roll within the ring, and means for pressing the roll against the ring, means for supporting the ring against the pressure of said roll, and means for laterally guiding the ring, consisting of lateral rollers arranged to roll against the flanks of said ring, and constructed with a yielding tread adapted to elastically resist lateral displacement of the ring.

13. In a pulverizer, the combination of a crushing-ring, a crushing-roll within the ring, a casing inclosing them, a shaft for said roll, yielding bearings for said shaft, a frame connecting said bearings and including a cross-yoke having its ends free of springs, and a spring bearing upon said cross-yoke and arranged to press the crushing-roll against the ring, and means for directly regulating the tension of such spring, substantially as shown and described, whereby an equal pressure is brought to bear upon the respective bearings of said shaft, tending to preserve parallelism.

14. In a pulverizer, the combination of a crushing-ring, a crushing-roll within the ring, a casing inclosing them, a shaft for said roll, yielding bearings for said shaft, longitudinal slides for said bearings, a transverse yoke free of springs upon its ends rigidly connecting said slides, and a spring bearing upon said yoke approximately in the direction of the crushing strain, and means for directly regulating the tension of such spring, substantially as shown and described, whereby the two ends of the crushing-roll shaft are caused to yield equally, and parallelism in its journals is maintained.

15. In a pulverizer, the combination of a crushing-ring, a crushing-roll within the ring, a casing inclosing them, a shaft for said roll, yielding bearings for said shaft, a frame connecting said bearings comprising slide-frames on each side formed rigidly with the bearings, a transverse yoke free of springs upon its ends, connecting said slide-frames; and a spring adapted to bear centrally upon said yoke; and means for directly regulating the tension of such spring, substantially as shown and described, whereby an equal pressure is brought to bear upon the respective journals of said shaft, and its parallelism is maintained.

16. In a pulverizer, the combination of a revoluble crushing-ring; a cylindrical crushing-roll within said ring; a continuous shaft to said crushing-roll; bearings for said shaft adapted to yield in unison radially to the roll; a metal hub unyieldingly attached to said shaft, a metal-working rim to said roll; and a rubber fabric or other elastic medium connecting said hub and said working rim; whereby the rim may yield both radially and circumferentially with relation to the shaft.

17. In a pulverizer, the combination of a revoluble ring, and a crushing-roll within said ring having a shaft, and constructed with a metal rim, an elastic yielding material embodied in its web, constructed of rings of such material applied from opposite sides, with holding-rings of rigid material sunk into the outer faces of said elastic rings, and fastening-bolts passed through from one rigid ring to the other to draw them together and thereby expand the elastic rings.

18. In a pulverizer, the combination of a revoluble crushing-ring, a crushing-roll within said ring, yielding bearings for the shaft of said roll, a casing inclosing said ring and roll, a feed-hopper with its spout extending into the upper space between the said ring and roll, and a shield mounted in said space and adapted to prevent the material from passing backwardly over the roll, the shield being formed integrally with the hopper-seat W and feed-channel V.

19. In a pulverizer, a revoluble ring, a crushing-roll within it, yielding bearings for the shaft of said roll, a casing inclosing said ring and roll, a feed-hopper adapted to deliver the material to be crushed into the space between said ring and roll, guard-plates flanking said space and extending between the spout of the hopper and the crushing-point between the ring and roll, adapted to prevent the spilling of the material outside the ring before it has acquired centrifugal force, said guard-plates formed with flanges fastened exteriorly to the casing, whereby the casing is narrowed, and the guard-plates rendered easy of access.

20. In a pulverizer, a revolving ring, a crushing-roll within it, a casing inclosing them, guard-plates flanking the spaces between said roll and ring wherein the crushing is effected adapted to be introduced through openings in the sides of the casing, and for attachment to the exterior of the casing, and the casing constructed with such openings and means for attachment.

21. The combination in a pulverizer embracing two crushing members, a casing within which they are mounted, guard-plates located to flank the junction of said crushing members where the feed for the same is delivered, a slot in the casing adapted to admit of the passage of such guard-plate from the outside to the inside of the casing, flanges upon said guard-plate adapted to remain outside of the casing, and seats for said flanges upon the outside of the casing.

22. In a pulverizer, a revolving ring, a crushing-roll within said ring mounted upon a shaft, guard-plates flanking the feed-spaces between said roll and said ring, a casing inclosing said parts, open at the top and bottom, and having openings and external seats for said guard-plates, a cap-piece closing the casing at the top, yielding bearings for said shaft, a supporting-roller for said ring, and bearings for said parts upon the outside of said casing and cap, whereby the inside of the casing and cap require no finish, and their construction with only one joint between them is attained.

23. In a pulverizer, the combination of a crushing-roll and its shaft, a casing, bearings for said shaft, means for guiding said bearings, a yoke connecting the two bearings, a single spring bearing centrally upon said yoke, a central spindle attached to said casing and passing through said yoke and spring, and a nut upon said spindle confining the spring, and whereby the tension of the spring is adjusted, and an equal pressure is exerted upon the respective bearings of said shaft.

24. In a pulverizer comprising a casing and crushing mechanism within it, the combination of a shaft extending through the casing, a bearing therefor outside the casing, and a stuffing-box around said shaft between said bearing and the inside of the casing, adapted to prevent access of dust to said bearing, and having openings through which to insert and remove the packing material.

25. In a pulverizer comprising a casing and crushing mechanism within it, the combination of a shaft extending through the casing, a bearing therefor outside the casing, an annular collar upon said shaft between the casing and bearing, and a stuffing-box around said shaft embracing said collar, and filled with cotton-waste or like material, whereby the dust is prevented from passing along the shaft beyond said collar.

26. In a pulverizer, a revolving cylindrical crushing-roll, combined with a reciprocal revolving part between which and said roll the crushing is effected, a continuous shaft fixedly attached to said roll, bearings for said shaft adapted to yield in unison radially to the shaft, a metal cylindrical hub fixed upon said shaft, a metal working rim to said roll, and a rubber fabric or other elastic medium connecting said hub and said working rim, whereby the rim may yield both radially and circumferentially with relation to the shaft.

27. In a pulverizer, a revolving crushing-roll, a yielding shaft upon which the roll is mounted, a metal hub upon said shaft, a metal crushing-rim for said roll, said hub and rim having coned faces, a rubber fabric connecting said hub with said rim, formed of two conical disks, and means for forcing said coned rubber-fabric disks into the space between said rim and hub, whereby the rim is mounted to yield circumferentially as well as radially.

28. In a pulverizer, a revolving crushing-roll, a yielding shaft upon which the roll is mounted, a metal hub upon said shaft having a coned and ribbed outer side, a metal crushing-rim for said roll having a coned and ribbed inner side, and a rubber fabric connecting said hub with said rim, formed of two conical disks, and means for forcing said coned rubber-fabric disks into the space between said rim and hub, whereby the rim is mounted to yield circumferentially as well as radially.

29. In a pulverizer comprising a crushing-roll and ring, a casing inclosing them, and means for lifting said ring consisting of a shaft insertible through said casing just within the upper part of the ring, and an eccentric portion adapted when the shaft is turned to engage and lift the ring.

30. The combination with a pulverizer of a feeding device comprising a chambered rotative cylinder, a hopper above said cylinder, the side wall $t$ of which over the descending side of the cylinder terminates some distance above the cylinder to leave a free intervening space through which pieces of stone may gravitate, and a yielding partition $t'$ arranged lower down and adjacent to the descending side of the cylinder, adapted to limit the descent of the gravitating stone, and to yield when pieces of stone lodged in the cylinder project beyond its periphery.

31. The combination with a pulverizer of a feeding device comprising a chambered rotative cylinder, a hopper above said cylinder, the side of which on the ascending side of the cylinder is extended to form a shield over the latter covering its chambers and preventing entrance of stone thereinto until they have reached approximately the uppermost position, thereby avoiding the falling of stone into the ascending chambers of said cylinder, and the consequent necessity of lifting the weight of such stone, and said hopper formed with its side over the descending side of the cylinder, inclined toward the middle and terminating some distance above the cylinder to prevent the stone crowding upon the cylinder.

32. The combination with a pulverizer of a feeding-hopper; a chambered rotative cylinder adapted to receive the stone from the hopper; a shield over the rising side of said cylinder, preventing the stone from impeding its rotation; a shield over the descending side of said cylinder, and a yielding side to the cylinder-casing adjacent to the descending side of the cylinder, whereby the descending stone is prevented from jamming between the cylinder and its casing.

33. The combination with a pulverizer of a feed-hopper, a chambered rotative cylinder adapted to receive the stone from said hopper, and mounted in a dust-proof casing, a shield over the rising side and a shield over the descending side of said cylinder, together with the end aprons which prevent the jamming of grit and stone between the ends of the cylinder and its casing.

In witness whereof I have hereunto signed my name in the presence of two subscribing witnesses.

ROBERT CREUZBAUR.

Witnesses:
GEORGE H. FRASER,
FRED WHITE.